March 22, 1938. N. C. SCHELLENGER 2,111,810
RHEOSTAT
Original Filed May 26, 1933 4 Sheets-Sheet 1
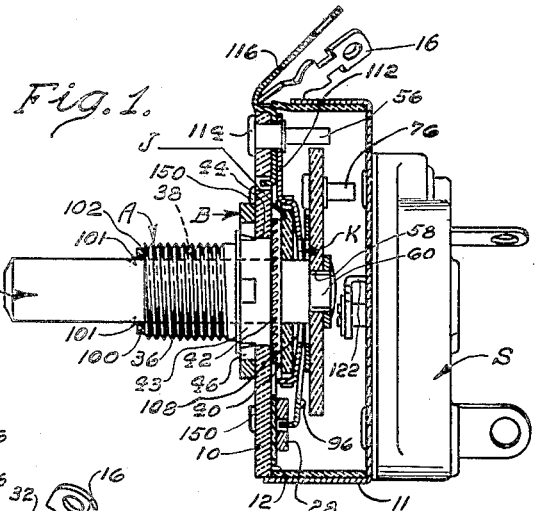
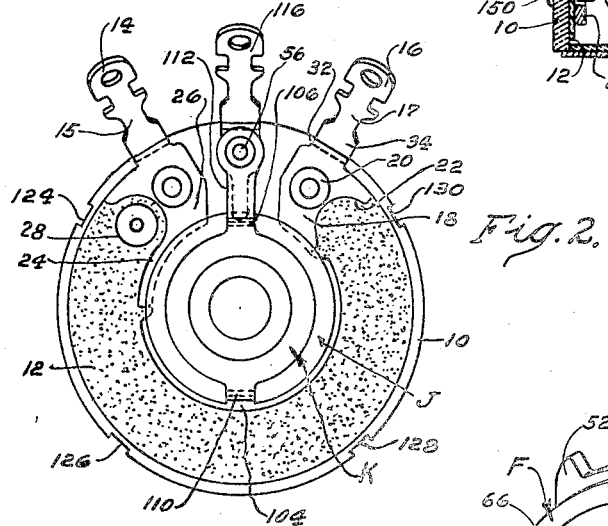
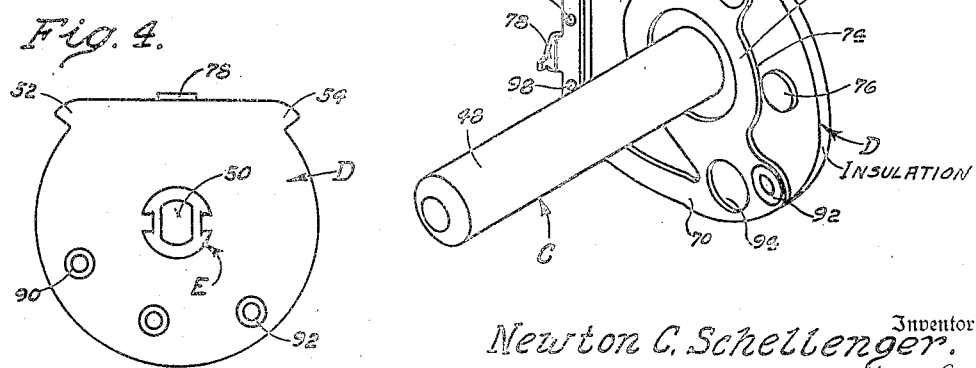
Inventor
Newton C. Schellenger.
by Wilkinson, Huxley, Byron & Knight
his Attorneys.

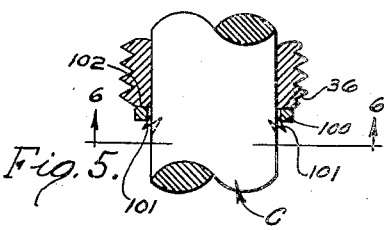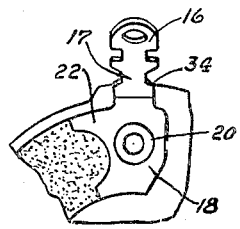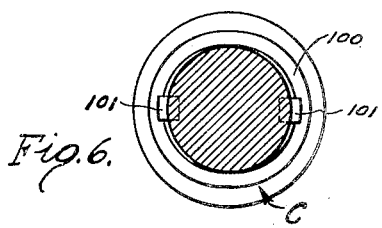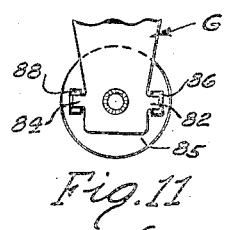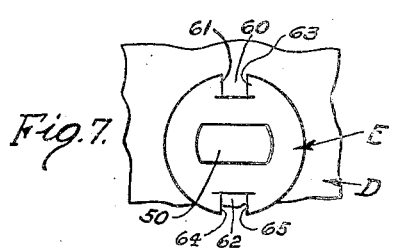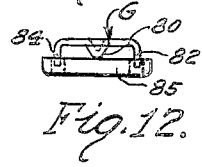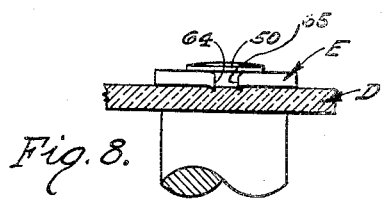

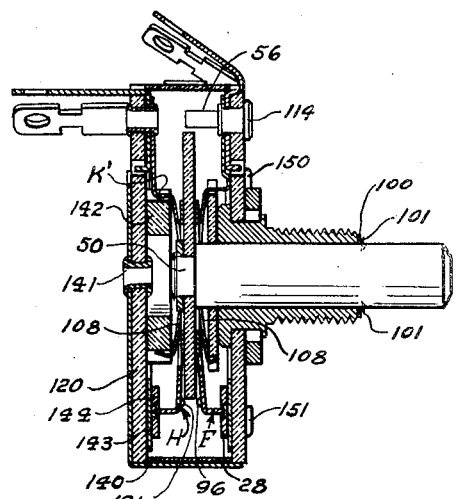
Fig: 13.
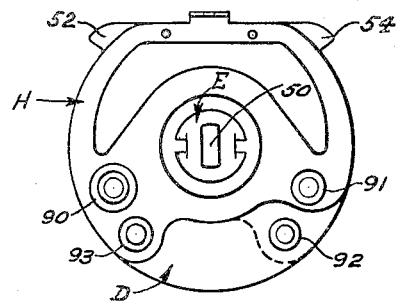
Fig: 16.
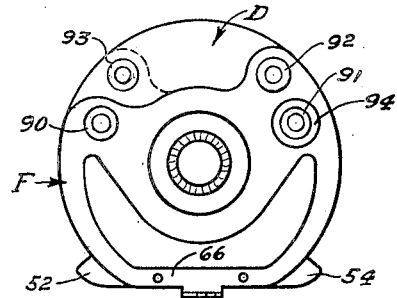
Fig: 17.
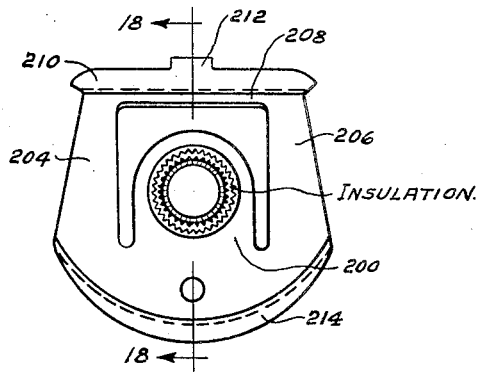
Fig: 14.
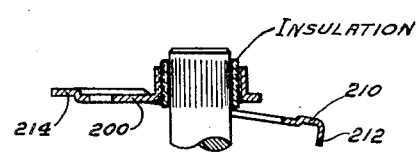
Fig: 18
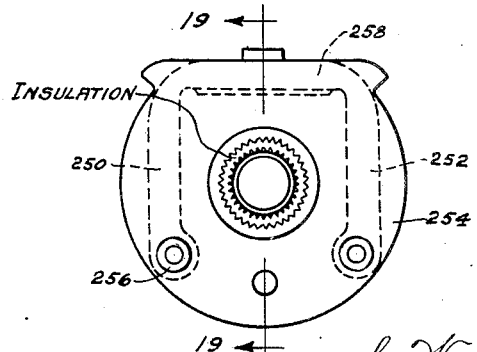
Fig: 15.
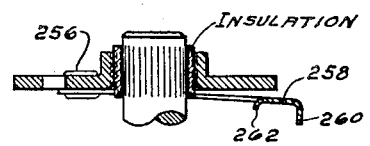
Fig: 19.
Newton C. Schellenger, Inventor
by Wilkinson, Huxley, Byron & Knight
his attorneys March 22, 1938.   N. C. SCHELLENGER   2,111,810
RHEOSTAT
Original Filed May 26, 1933   4 Sheets-Sheet 4

Newton C. Schellenger, Inventor
by Wilkinson, Huxley, Byron & Knight,
his Attorneys.

Patented Mar. 22, 1938

2,111,810

UNITED STATES PATENT OFFICE 2,111,810

RHEOSTAT

Newton C. Schellenger, Elkhart, Ind., assignor to Chicago Telephone Supply Company, a corporation of Indiana Original application May 26, 1933, Serial No. 672,955. Divided and this application October 7, 1935, Serial No. 43,978

3 Claims. (Cl. 201—55)

My invention relates to electrical control devices and more particularly to a rheostat of the general type used for volume control and related purposes in radio circuits, and this application is a division of my co-pending application Serial No. 672,955, filed May 26, 1933 which has matured into Patent 2,043,777.

It is an object of my invention to employ a spring arm of very light material, which engages the contact shoe of the resistance element.

A further object of my invention is to embody an inconspicuous, serviceable device whereby a violent jolt of the unit will not dislodge the contact shoe from the pressure arm.

A further object of my invention is to construct the terminal members so that an inadvertent bending or displacement of the low resistance terminal member will cause no change in the low resistance "hop-off."

Still another object is the provision in such devices of terminals or connection lugs adapted to slotted or notched engagement with a base member, and having foot portions for engagement with a resistor member.

Other objects of this invention are to provide an improved device of the character described, that is easily and economically produced, which is sturdy in construction and which has a maximum of efficiency and accuracy.

With the above and related objects in view, my invention consists in the following details of construction and combination of parts, as will be more fully understood from the following specification, taken in conjunction with the drawings, in which:

Figure 1 shows a fragmentary sectional view of my invention embodied in a rheostat and combined with a snap switch;

Figure 2 is a plan view of the resistance element and terminals;

Figure 3 is a perspective view of the contactor arm, its support and shaft;

Figure 4 is a rear view of the contactor arm support, showing the unsymmetrical placing of the holding rivets;

Figure 5 is a fragmentary side elevational view showing the swedging out of the shaft holding means at the end of the bushing;

Figure 6 is a sectional view taken on the line 6—6 of Figure 5;

Figure 7 is a plan view of the washer biting into the insulating plate;

Figure 8 is a fragmentary side elevational view of Figure 7, more clearly showing the burr on the edge of the slots of the washer;

Figure 9 is a fragmentary side elevational view showing the attachment of a terminal;

Figure 10 is a fragmentary plan view of the terminal;

Figure 11 is a plan view of a modified contactor arm and contacting shoe;

Figure 12 is a front view of the shoe and contactor arm shown in Figure 11;

Figure 13 is a fragmentary sectional view of a tandem arranged rheostat embodying my invention;

Figure 14 is a plan view of another type of pressure arm wherein the arms are supported in a manner to prevent twisting;

Figure 15 is a modification of the arm as disclosed in Figure 14;

Figure 16 is a plan view of a tandem arranged pressure arm;

Figure 17 is the opposite face of Figure 16;

Figure 18 is a cross-sectional view taken on the line 18—18 of Figure 14.

Figure 19 is a cross-sectional view taken on the line 19—19 of Figure 15;

Figure 20:
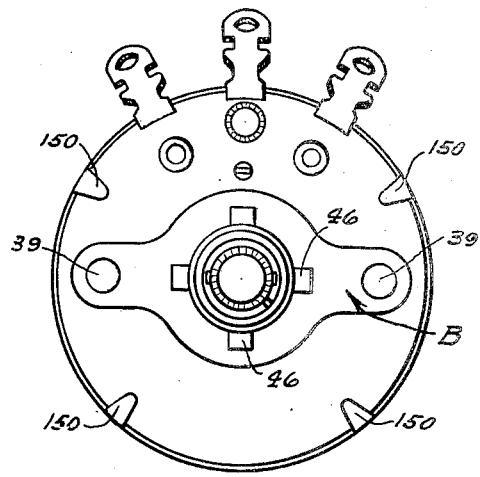
Figure 20 is a plan view of the rheostat shown in Fig. 1.

Referring now to the drawings in more detail, particularly to Figs. 1, 2 and 3, it will be seen that the instrumentalities of the rheostat are mounted upon a base or mounting disc 10 which may conveniently be formed of an insulating material such as phenol condensation product commonly known as "bakelite." The resistance element 12, preferably a carbonaceous coated strip of generally arcuate shape, is placed upon one of the flat faces of the base or mounting disc 10, and is held thereagainst by terminal members 14 and 16 engaging its ends.

As will be seen in Figs. 2, 9 and 10, the terminal member 16, of a single strip of conducting material of uniform thickness, has a foot 18 disposed in engagement with one end of the resistance element 12 and is pierced for the reception of an attaching means, shown for convenience as an eyelet 20. The foot portion 18 of the terminal contains an arcuate recess 22 so that the length of the terminal edge in close proximity to the shoe, when the shoe is adjacent the terminal, will be greater than if the terminal had a straight edge extending across the resistance element, and as a consequence the minimum resistance between the shoe and the terminal is lower than would otherwise be obtained.

The terminal member 14, at the low resistance end of the resistance element, may have a diverging extension 24 from the foot member 26, as shown in the terminal 14 of Fig. 2, to engage an edge of the resistance element to provide for a slow resistance increase upon the arcuate movement of a contact shoe 28. In this manner, virtually any desired initial resistance gradient may be obtained.

A similar arrangement may be embodied at the high resistance terminal, and the only thing necessary will be to make the high resistance terminal complementary to the low resistance terminal, that is, one of the members is a right hand member and the other a left hand member.

The diverging extension 24 also functions to keep a low initial resistance in the circuit until the switch, mounted on the cover, is closed.

The neck 30 of the terminal 16 is bent sharply adjacent the foot portion 18 and is fitted in a slot 32 in the periphery of the mounting plate 10 to prevent the terminal member from being turned circumferentially with respect to this plate. The neck is then turned back upon itself and tapers in width, as indicated at 34. The terminal extends at an angle to the plane of the cylindrical casing face to permit the easy attachment of the various lead wires. To prevent the displacement of the foot portion of the terminals 14 and 16 with a consequent increase in the minimum resistance, should there be an axial bending of the terminals, narrow sections 15 and 17 respectively have been provided in the lug portion of the terminals so that bending will first take place at these points and no harm result.

Bushing

Mounted concentrically in the disc 10 is a suitable journal bushing or thimble, generally designated as A, which may also serve as a panel mounting device for the unit. This bushing A may be threaded exteriorly as at 36 for the reception of a nut by which the assembly is clamped upon a suitable panel or bracket, that is, by the usual and well known type of mounting, and the bushing also has a central longitudinal opening 38 therethrough.

The bushing A contains an annular flange 40 disposed against the surface of the disc 10 upon which the resistance element 12 is located, and if desired, this flange 40 may be serrated on one face as shown at 42 so that it will bite into the disc 10 and lock that disc against rotation with respect to the bushing.

A shoulder or swaged portion 43, of smaller diameter than the flange and emerging from the flange, protrudes through the base opening 44 and also through a central opening in a holding clamp B, and the end of the shoulder 43 is swelled to grip the face of the clamp and to engage a plurality of spaced niches 46 (Fig. 20) in the clamp B for the prevention of rotary motion of the disc and the holding clamp B in a direction about the axis of the shaft, and in a direction along the shaft. If further rotational restraint is desired, burrs are provided along the radial edges of the niches 46, so that they engage the disc 10 when the shoulder 43 of bushing A is swaged in place. This very definitely locks the disc 10 and clamp B together and may be used instead of the knurling 42 on the flange 40. Protruding lugs 39 on the clamp B are adapted to co-operate with holes in the panel, upon which the rheostat is to be mounted, and prevent rotation of the rheostat relative to the panel.

Contactor arm

An operating shaft, generally designated C, and journaled in the thimble A, is comprised of a cylindrical portion 48 of suitable length and a reduced substantially rectangular end 50, see Figs. 3 and 4. A thin insulating plate D of substantially circular formation, has a plurality of extending ears 52 and 54 on the periphery adapted to engage a suitable stop member 56 protruding from the stud 114 for limiting the rotation of the arm in either direction, and the plate, also, has a central elongated opening 58 to fit onto the end 50 of the shaft. The insulating plate is placed upon the reduced end 50 of the shaft 48 and a washer, generally designated E, having a central opening to also fit onto the reduced end 50 of the shaft is placed thereon and the face of the reduced end is then swaged over, holding the shaft C, the plate D and the washer E in position. The washer has, see Figs. 7 and 8, a plurality of radial slots or notches 60 and 62 with burrs 61, 63, 64 and 65 along the radial edges of the notches, which burrs are adapted to bite into the insulating plate, thus preventing relative rotation of the shaft and insulating plate.

A resilient contactor or pressure arm F, preferably of a single piece of suitable thin conducting material and supported by the plate D, is comprised of an arcuate shaped cantilever arm 66 supported at each end by integral formed yoke portions 68 and 70, which yoke portions in turn are united to a central slip-ring section 72 having an internal diameter substantially larger than the diameter of the shaft 48, as shown in Figure 3, to space the slip ring section from the shaft in an insulating relationship thereto. The contactor arm is also provided with a peripheral cut-out portion 74, which is adapted to fit about an eccentrically mounted operating pin 76 carried by the insulating plate D. The arcuate shaped arm has verging from its unsupported mid-portion a projecting tip or boss 78 adapted to engage the perforated disc or shoe 28, which engages the resistance element. However, the tip may be constructed to actually engage the resistance element, or may take a variety of forms as shown in Figs. 11 and 12, as hereinafter more fully described.

A modified pressure arm G, Figs. 11 and 12, has a short conical boss 80 and two projecting lugs 82 and 84.

A flat contact shoe 85 has two diametrically opposed holes 86 and 88 therein, which receive the projecting lugs 82 and 84, respectively, of the pressure arm. The pressure exerted by the arm G is directed against the central portion of the shoe 85 by the conical boss 80 engaging the upper surface of the contact shoe.

The contact shoe is drawn along the resistance element by one or the other lug of the pressure arm engaging the edge of one of the holes in the shoe 85, so that the shoe is always pulled along the resistance element.

The contactor or pressure arm F is mounted upon the insulating plate by means of suitable eyelets or rivets 90 and 92, see Figs. 3, 16 and 17, which eyelets or rivets are unsymmetrically placed, as will be hereinafter further described. The arm F is so mounted that the tip 78 will be approximately equi-spaced from the extending ears 52 and 54, Fig. 17.

Now referring again to my preferred embodiment shown in Fig. 3, the stamped-out arm F has an aperture 94 near the rivet 92 to provide clearance around a rivet or bolt 91 (Fig. 17), when a second arm H (Fig. 16) is inserted on the opposite face for a tandem arranged series of rheostats.

Pressed out projections 96 and 98 to each side of the free end of the cantilever arm and extending in a direction opposite to that of the tip 78 are adapted to engage one face of the insulating disc to prevent the contacting shoe from separating from the lug 78.

Considerable difficulty is experienced when manufacturing rheostats, in securing a uniform predetermined pressure between the contacting shoe and the resistance element, and between the spring member K and the contact arm F, both of which are very necessary if low resistance contacts and long life are to be expected. Predetermined pressures are obtained with my rheostat by assembling the parts in proper axial alignment and then applying the desired pressure to the shaft C in an axial direction and in such a manner that it is resisted by the pressure between the contacting shoe and resistance element plus the pressure between the arm F and spring member K. These pressures are maintained by swaging the shaft, when in the desired position (Figs. 1, 5, and 6), at 101, so that it is enlarged at this point and forms a shoulder that bears against the washer 100, which is in contact with one end of the thimble A.

It is particularly to be noted that with this method of assembly, no unnecessary strain whatsoever is placed upon the contactor or resilient arm by pressing the contact shoe 28 in engagement with the resistance element during the swaging action.

*Slip-ring and washer*

Disposed upon the surface 102 of the thimble A is an insulating washer J, Figs. 1 and 2, having diametrically placed peripheral notches 104 and 106 therein.

A ring-shaped slip-ring member, generally designated K, and having a concave face 108 adjacent the insulating washer J, has a short lug 110 and a long lug 112, Figs. 1, 2 and 13, extending from the periphery of the face 108. The lugs 110 and 112, when suitably bent, extend or fit into the notches 104 and 106 of the insulating washer, and the long lug is also adapted to provide the electrical take-off for the derived electrical circuit. The stud 114 serves to connect the long lug 112 of the slip-ring member to a terminal 116 and secures the slip-ring and terminal in electrical relationship. It is to be particularly noted, see Fig. 1, that the slip-ring K is axially resilient to provide a good electrical contact with the movable slip-ring 72.

Both the washer J and the slip-ring member K are provided with central aligned openings for receiving the control or operating shaft C, the apertures formed in the slip-ring member K being of a larger diameter than the opening or aperture through the washer J, so the slip-ring member K will be spaced from the control shaft and thus insulated therefrom.

*Tandem*

Heretofore, the tandem or double type of rheostat construction, in which the pressure arms were insulated from each other (shown in Fig. 13) required a large casing, but by my novel unsymmetrically arranged contact arm F supported upon the insulating base D (shown in Figs. 16 and 17) by eyelets 90 and 92, I economize in space by placing an additional contact arm H, similar in structure to the arm E, (but one arm being so-called "right-handed" and the other "left-handed") upon the vacant face 118 of the insulating strip and securing it in place with eyelets 91 and 93. It will be noted that there is no electrical connection between the two arms, as each arm is cut out both to clear the eyelets that hold the arm in place, and to clear the shaft. I have thus provided an insulated pressure arm for the second rheostat section without the addition of another shaft, bushing, or mounting plate, such as has been used in the past. The second rheostat section is comprised of a second insulating base 120, held in the housing 140 by the eyelet 141, and positioned angularly by formed-in sections in the housing cooperating with notches in the periphery of the base 120. A resistance element 143 is carried by the base 120 and is contacted by a shoe 144 driven by the pressure arm H. Terminals for the resistance element and for the spring connector K, which contacts the arm H, are provided and extend through notches in the base 120 and through an opening in the metal housing 140 that is sufficiently large to provide good insulation.

*Switch operation*

In order to provide for the operation of a switch or circuit controller, the insulating disc D may be provided with an eccentrically mounted pin 76.

This pin 76 projects normal to the plane of the insulating disc and is located to engage an operating arm or ear 122 of the switch mechanism S. A movement of the insulating disc D will, therefore, operate the switch mechanism. The switch S, shown by way of example, may be any preferred type of switch suitable for this purpose, such as the switch shown in my co-pending application, Serial No. 602,006, filed March 30, 1932, to which application reference is now made for the details of the construction of the switch and the manner of mechanical arrangement.

*Mounting*

The casing 11, within which the rheostat is housed, is provided with a plurality of projecting ears 150, which are registered in peripheral slots 124, 126, 128 and 130 on the base and bent over to attach the casing to the plate. The registration of the ears with their respective slots 124, 126, 128 and 130, accurately aligns and holds the housing with respect to the plate both in a rotary direction about the axis of the shaft and in a direction along the shaft. By this means, the alignment of the rheostat and switch may be predetermined so that the two will function cooperatively.

The casing or housing for the rheostat, which also supports the switch, may be attached to the base by any suitable means, but preferably by the means as disclosed in either of my co-pending applications, Serial No. 668,757, filed May 1, 1933 or Serial No. 671,031, filed May 15, 1933, which has matured into Patent No. 2,059,813.

It is in many cases advantageous to provide a rheostat enclosed almost entirely in metal, so that all of the operating parts are electrostatically shielded from outside electrical disturbances. This is especially true when a switch is mounted on the cover and is to be used for switching a fluctuating current. I have found it possible to very efficiently and economically accomplish both of the above results with the plate L (Figs. 21 and 22) from which the lugs 239 are formed.

Plate L is mounted over the base 10 so that the insulating base is almost completely shielded. This plate L is also in electrical contact with the mounting bushing or thimble A, which will normally be mounted on a grounded metal panel, and has clinched over onto it the ears 150 of the cover member 11. It is therefore necessary to ground only the thimble to accomplish the necessary electrostatic shielding of the rheostat from the switch and other external disturbances. In many instances, it is possible to effect economies in the manufacture of radio sets by extending the grounding plate to one of the terminals of the resistance element.

Figure 21:
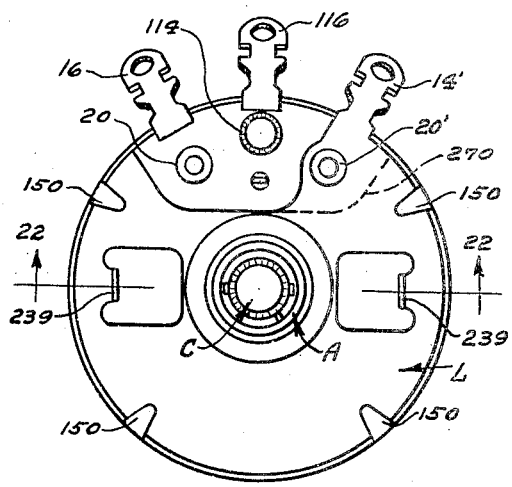
Figure 21 is a plan view of my rheostat, showing a cover grounding plate and positioning lugs.
Figure 22:
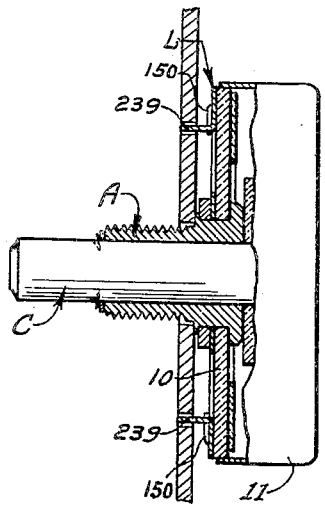
Figure 22 is a broken sectional view of the rheostat shown in Figure 1.

In Fig. 21, I have shown plate L carrying a terminal 14, which replaces one of the regular terminals. This terminal is normally connected to ground by virtue of being a part of the plate L, which is normally grounded. It is also connected to one end of the resistance element (the end that is desired to be grounded) by the eyelet 201 and a washer or plate on the inside of the rheostat bearing against the element and held in place by the eyelet. When a grounded terminal is not desired, the plate L is made according to the dotted lines 270.

Two ears 239 integral with the plate L and formed at right angles to it are adapted to register with holes in the mounting panel to prevent rotation of the control relative to the panel during assembly and afterward. A washer or spacer 276 is assembled on the thimble A, preferably in a permanent manner, to provide an even substantial mounting surface and to space the terminals and ears away from the panel.

Referring now to Figs. 14 and 18, I show a pressure arm of the same general type as, but having certain valuable improvements over, the arm covered in my Patent No. 1,913,686 of June 13, 1933. With the arm of my prior patent, there was a tendency for the two converging sections to twist when a pressure was applied against the contact paddle, due to the bowing of the yoke section caused by the pressure on the ends of the yoke being in a reverse direction to that on the contact projection. This twisting seriously impaired the flexibility of the arm as a whole, since the legs were free to bend in the desired direction for only a small part of their total length, the balance of their length being twisted and not free to bend.

This is overcome in the arm disclosed in Figs. 14 and 18 by strengthening the yoke carrying the lug 212 by a rib or offset portion 210, and by strengthening the rear section with a rib or offset portion 214. By strengthening the front and rear yoke portions in this manner, twisting of sections 204 and 206 is prevented, and a good distribution of flexing obtained.

I have accomplished this same end in the arm shown in Figs. 15 and 19 by securing the ends of portions 250 and 252 to the plate 254, which is quite rigid, by eyelets 256 and by strengthening the front yoke portion by bending a portion 262 at a substantial angle to the main part of the yoke 258.

Although the invention has been described in considerable detail, such description is intended as illustrative rather than limiting, as the invention may be variously embodied, and the scope of the invention is to be determined as claimed.

I claim as my invention:

1. In a variable resistance device, the combination with a flat insulating base having a notch in its peripheral portion, a resistance element on said base, and a contact shoe engaging said resistance element, of a terminal comprising a foot portion overlying and engaging said resistance element, an integral connection lug portion, and a reversely bent offset portion extending downwardly to seat in the notch in said base to assist in maintaining the terminal in fixed position upon the base, said reversely bent portion having an outer portion extending outwardly away from the center of the base between said foot portion and said connection lug portion to form a solder receiving recess.

2. In a variable resistance device, the combination with a flat insulating base having an open slot in the edge thereof, and a resistance element on one face of said base, of a terminal having a foot portion lying against said face of said base in contact with the end of said resistance element, a connection lug portion extending away from said base and a reversely bent portion forming a solder trapping recess intermediate said foot portion and said connection lug and seated in said slot to assist in maintaining the terminal in fixed position relative to said insulating base.

3. In a variable resistance device, the combination with a flat insulating base having portions cut away in its peripheral region, a resistance element on said base, and a contact member engaging said resistance element, of a terminal comprising a foot portion overlying and engaging said resistance element, an integral body portion extending outwardly and upwardly away from the center of the base and having a reversely bent offset part seatable in the said cut-away portions of said base to assist in maintaining the terminal in fixed relation to said base and forming an open solder trapping recess connecting said foot and said body parts.

NEWTON C. SCHELLENGER.